United States Patent [19]

Grünner

[11] 4,277,233
[45] Jul. 7, 1981

[54] TURNTABLE APPARATUS FOR MOLDING TIRES

[76] Inventor: Erich Grünner, Voltagasse 43/23/1, 1210 Wien, Austria

[21] Appl. No.: 925,462

[22] Filed: Jul. 17, 1978

[30] Foreign Application Priority Data

Jul. 15, 1977 [AT] Austria .................................. 5149/77

[51] Int. Cl.³ .......................... B29F 1/00; B29C 6/00; B29H 5/02
[52] U.S. Cl. ................................... 425/588; 425/542; 425/577
[58] Field of Search ..................... 425/34 R, 577, 588, 425/33, 542, 129 R

[56] References Cited

U.S. PATENT DOCUMENTS

| | | | |
|---|---|---|---|
| 1,900,456 | 3/1933 | Mead | 425/34 R X |
| 1,931,638 | 10/1933 | Abbott | 425/33 |
| 2,710,425 | 6/1955 | Rhodes | 425/34 R |
| 2,897,540 | 8/1959 | Rhodes | 425/129 R |
| 3,054,141 | 9/1962 | Hammesfahr | 425/34 R |
| 3,477,100 | 11/1969 | Peck et al. | 425/34 R |
| 3,988,077 | 10/1976 | Narator st al. | 425/34 R X |
| 4,124,345 | 11/1978 | Grünner | 425/34 R X |
| 4,197,068 | 4/1980 | Pizzorno | 425/577 X |

Primary Examiner—J. Howard Flint, Jr.
Attorney, Agent, or Firm—Michael J. Striker

[57] ABSTRACT

An apparatus for molding tires comprises a first turntable on which a plurality of mold carriers are mounted circumferentially spaced from each other and each removably carrying a split core configurated to define the inner surface of a tire to be molded and a plurality of outer mold parts arranged about the core and configurated in accordance with the outer surface of the tire, a second turntable adjacent the first turntable and provided on its upper surface with a plurality of first depositing stations equal in number to that of the plurality of mold carriers of the first turntable for respectively receiving the cores and a plurality of second depositing stations equal in number to said first plurality of depositing stations for respectively receiving finished tires. The two turntables are turnable stepwise and synchronously, preferably in opposite directions, about vertical axes. The apparatus includes further a first carriage for transferring cores with the finished tires thereon from the first to the second turntable and a second carriage for transferring cores separated from the finished tire from the second turntable to the mold carriers on the first turntable.

8 Claims, 5 Drawing Figures

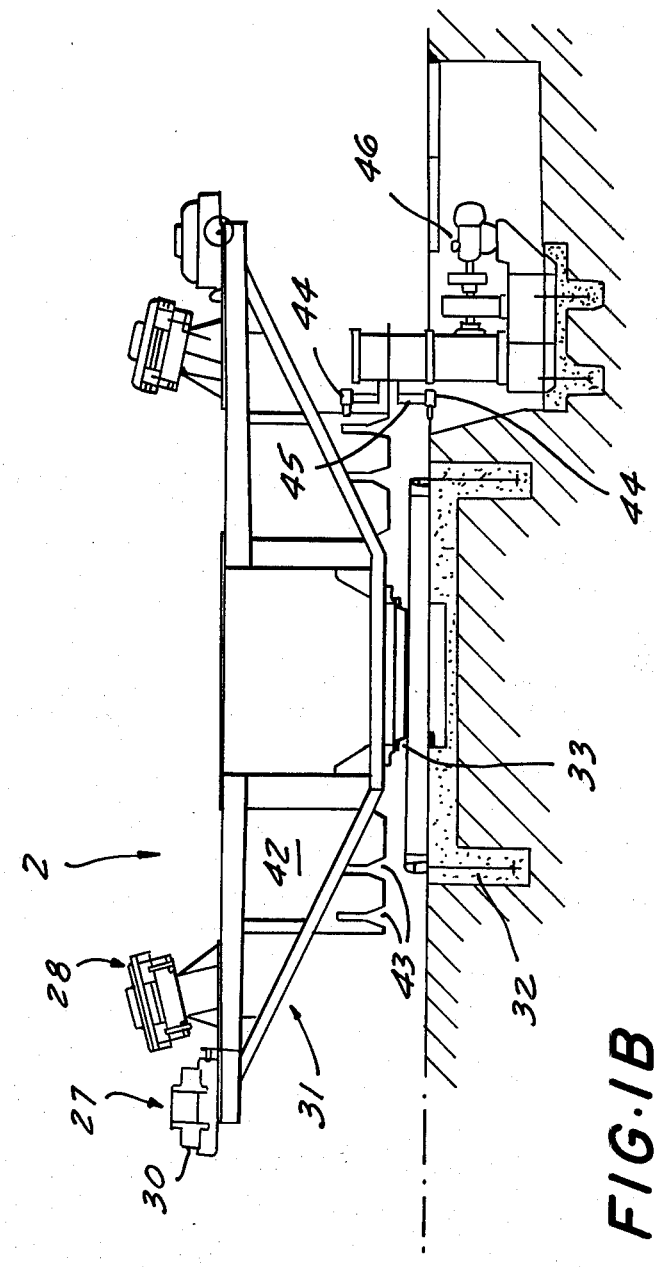

TURNTABLE APPARATUS FOR MOLDING TIRES

BACKGROUND OF THE INVENTION

The present invention relates to an apparatus for molding of vehicle tires provided with a plurality of molds mounted on mold carriers in which each of the molds comprises a plurality of mold parts for forming the outer surface of the tire arranged about an inner core configurated according to the inner surface of the tire to be molded.

In apparatus of this kind known in the art the usually segmentally divided cores are removed by hand, together with the tire molded thereon, from the other mold parts and subsequently the molded tire is removed from the core. This removal of the cores from the tires requires in apparatus known in the art considerable time and labor in that the tires with the cores therein have first to be transported to a place at which the cores are taken out from the tires in disassembled condition, whereafter the core parts are reassembled again and the reassembled core parts are subsequently returned to the apparatus. The up-to-now used transport carriages for this purpose could solve the above-mentioned problem only in a rather imperfect manner.

SUMMARY OF THE INVENTION

It is an object of the present invention to provide an apparatus of the aforementioned kind which is constructed in such a manner that the removal of the cores from the tires as well as the reassembly and preparation of the cores for the respective next use in the mold may be carried out in a space-saving manner and with the least necessary effort.

It is a further object of the present invention to correlate such a device with another device for the production of tires of different dimensions.

With these and other objects in view, which will become apparent as the description proceeds, the apparatus according to the present invention for molding tires mainly comprises a plurality of multi-part molds each comprising an inner split core configurated in accordance with the inner surface of a tire to be molded and a plurality of outer mold parts arranged about the core and configurated in accordance with the outer surface of the tire, a plurality of mold carriers, one for each of said multi-part mold, a first turntable having a vertical axis and carrying on an upper surface thereof said plurality of mold carriers circumferentially displaced from each other, a second turntable adjacent to the first turntable and having an axis parallel to that of the first turntable and being provided on its upper surface with a first plurality of depositing stations circumferentially displaced from each other and equal in number to the plurality of the multi-part molds for receiving the cores and a second plurality of depositing stations circumferentially displaced from each other and equal in number to said first plurality of said depositing stations for receiving finished tires produced in the mold, and means for turning the first and the second turntables synchronously and stepwise about their axes.

In the apparatus according to the present invention, the second turntable is therefore provided with depositing stations for the cores, respectively the core parts, as well as with additional depositing stations for the finished tires, whereby due to the synchronous turning of the two turntables correlated units are always moved to a position opposite each other.

In a preferred construction of the apparatus according to the present invention the first turntable comprises at least ten and preferably eighteen mold carriers. Due to the correlation of mold carriers and depositing stations, it is possible with a minimum of mold carriers and depositing stations to simultaneously produce different tires in a single apparatus.

The depositing stations on the second turntable are preferably arranged on two concentric circles. Preferably the depositing stations on the radially outer circle on the second turntable serve for depositing the cores, respectively the core parts, whereas the depositing station on the inner circle are formed for depositing the finished tires.

Preferably, the upper surface of the second turntable which carries the mentioned depositing station is arranged at the same level on which the molds are arranged on the first turntable and the apparatus further includes a first carriage for transferring the cores from the first depositing stations of the second turntable to the mold carriers on the first turntable and a second carriage for transferring finished tires including the cores from the first to the second turntable.

In a preferred construction according to the present invention, the mold carriers on the first turntable may be tilted from an essentially vertical starting position to an essentially horizontal end position and be fixedly held in intermediate positions between the starting and the end position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1A and 1B illustrate together a partly sectioned side view of the apparatus according to the present invention;

DESCRIPTION OF THE PREFERRED EMBODIMENTS

Figure 1A:
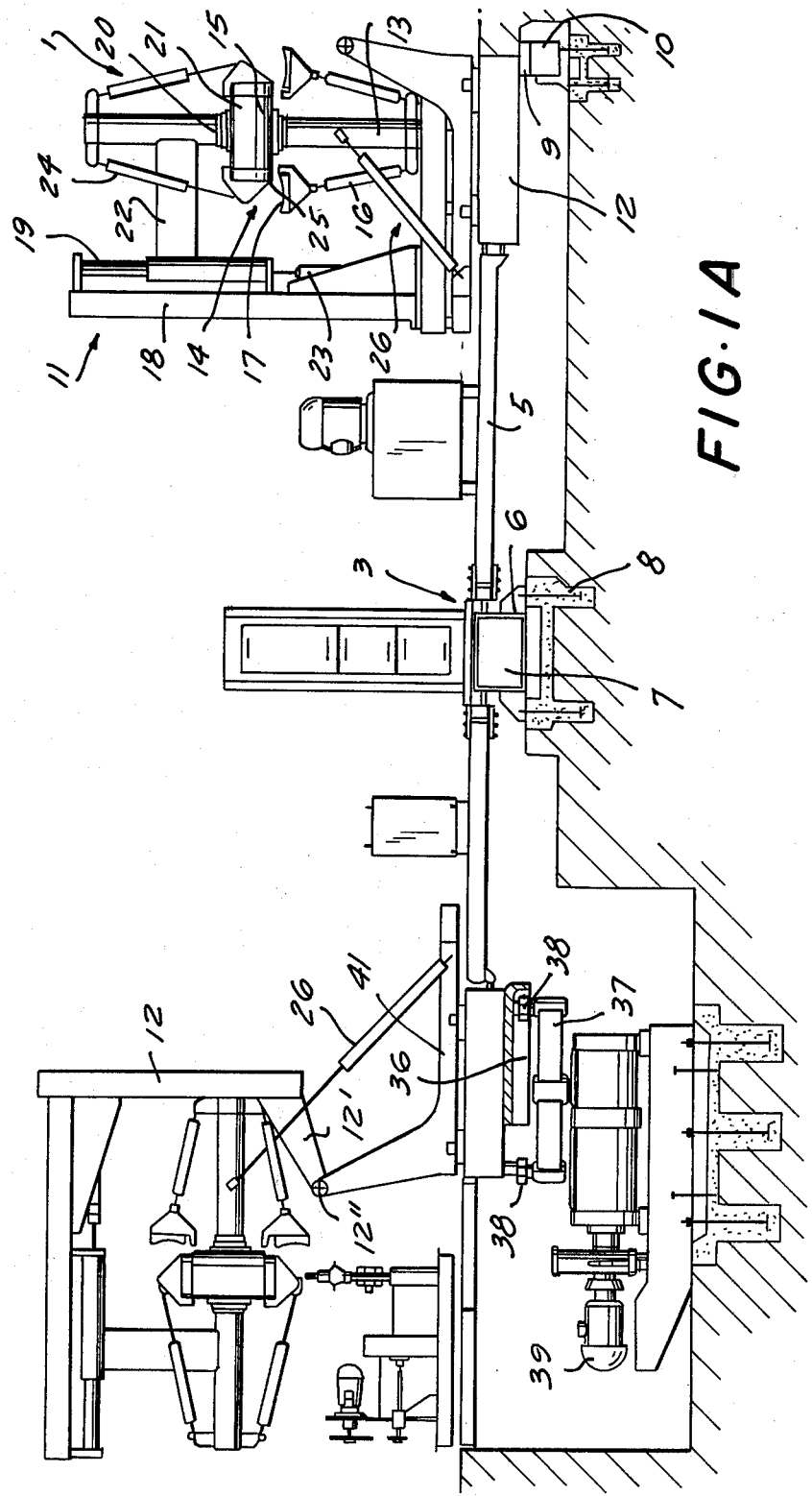

Referring now to the drawing, it will be seen that the apparatus according to the present invention comprises a first turntable 1 constructed as an annular box-shaped carrier 4 connected by a plurality of radially extending spokes 5 to a central hub 3 provided with a radial bearing 6 preferably constructed as a roller bearing. The bearing 6 and therewith the annular carrier 4 are turnably mounted on an upright tubular bearing member 7, which in turn is fixedly connected to a foundation 8.

Figure 2A:
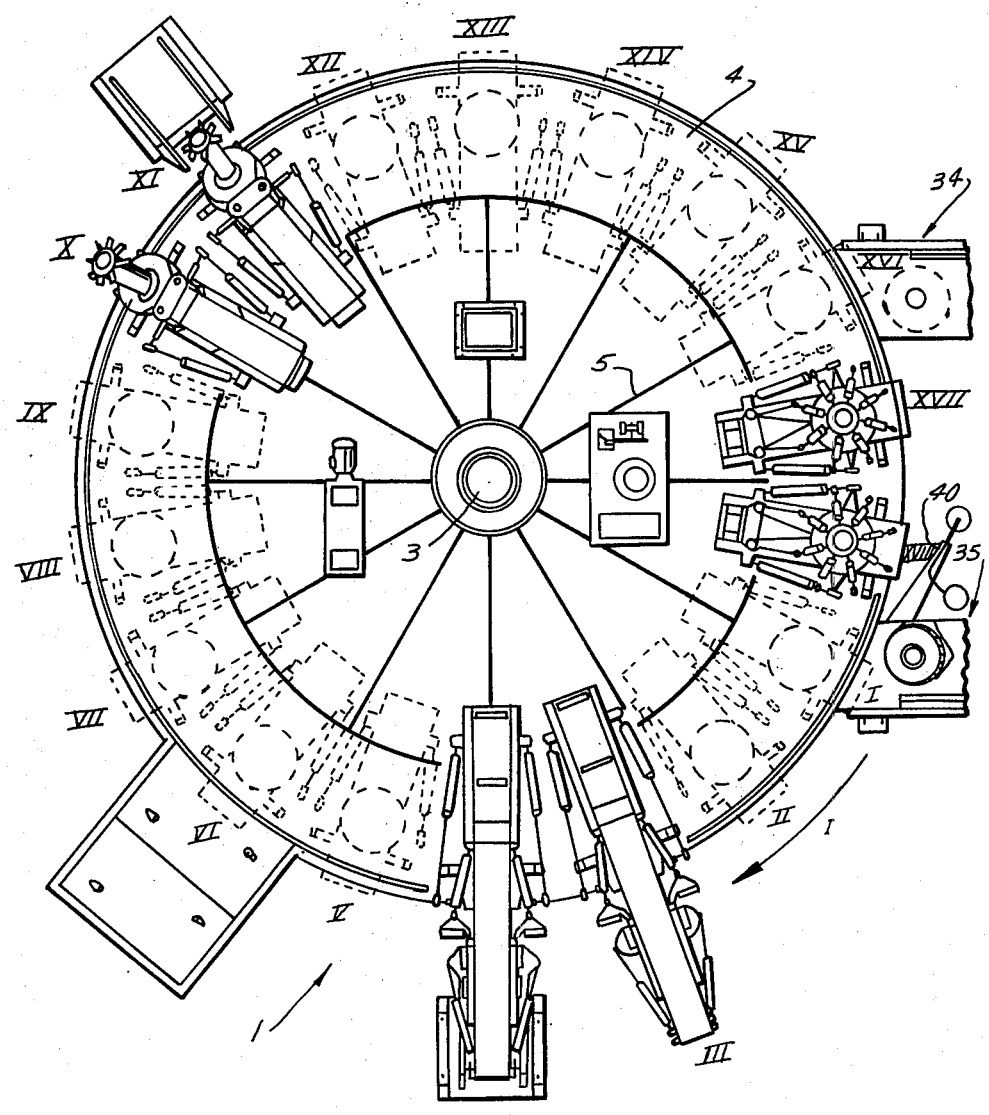
FIGS. 2A and 2B illustrate together a top view of the apparatus shown in FIG. 1.
Figure 2B:
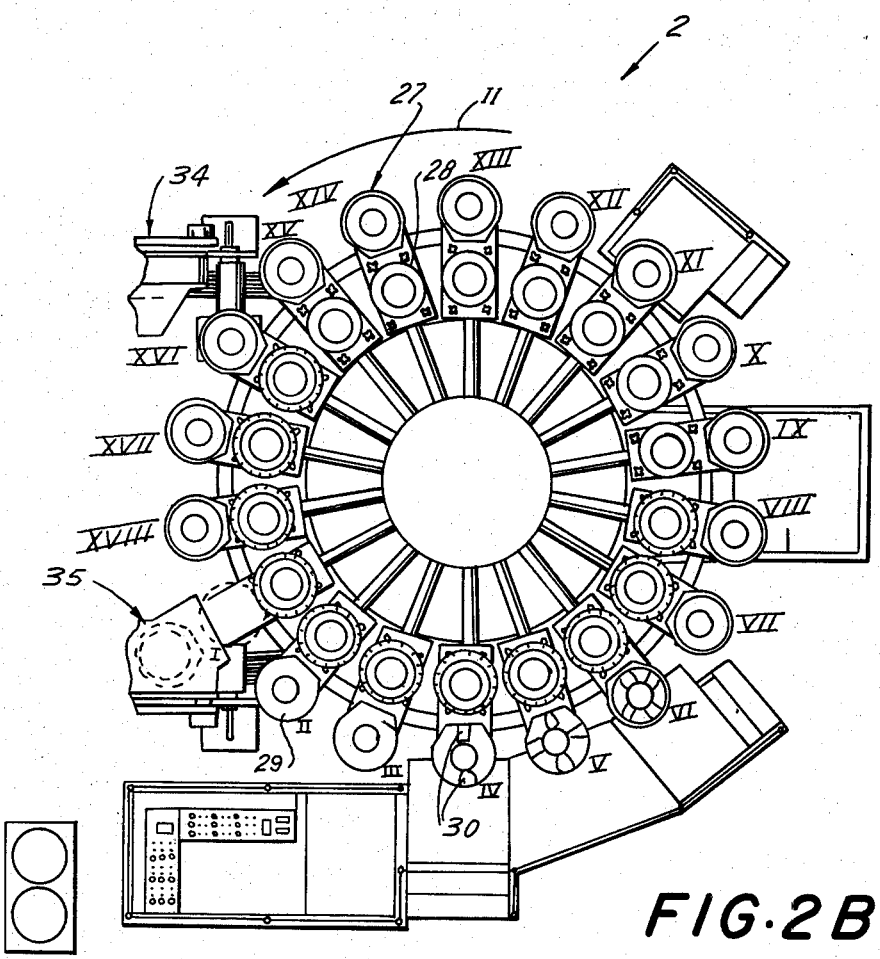

The bottom face of the annular carrier 4 has a finished horizontal surface on which an annular rail 9 is removably mounted. The annular rail 9 abuts with a bottom face thereof against a plurality of rollers 10 mounted turnably about horizontal axes on the foundation 8 so that the turntable 1 is properly supported in the region of the outer peripheral surface of its annular carrier 4. A plurality of drive segments 36, 18 in the embodiment illustrated, are connected to the bottom face of the turntable 1 into which two rollers 38 mounted on opposite ends of the horizontal arm 37 are adapted to engage. The arm 37 is turned about a vertical axis by a drive motor 39 over a gearing arrangement so that during turning of the arm 37 through 180°, the turntable 1 is turned through 20° in the direction of the arrow I shown in FIG. 2. This arrangement will result in a smooth starting and braking of the turntable 1 during operation of the drive motor 39 with a constant number of revolutions per minute.

A plurality of L-shaped mold carriers 11, likewise 18 in the embodiment illustrated, are mounted in the upper surface of the turntable 1. The lower horizontally extending part 12 of each L-shaped carrier 11 is provided with an upwardly extending column 13 with connecting flanges for the lower end part 15 of a mold 14. A plurality of radially arranged cylinder-and-pistons means 16 are further provided for the lower segment 17 of each mold which are constructed to form the region of the tire to be molded which is located radially inwardly of the tread surface thereof.

A vertically extending guide column 19 is mounted on the lateral upright portion 18 of each L-shaped mold carrier 11 and a connecting flange 20 for the upper end part 21 of the mold is movably mounted by means of a carrier 22 on the guide column 19. The carrier 22 is movable along the guide column 19 by a cylinder-and-piston unit 23. The carrier 22 is further provided with a plurality of radially extending cylinder-and-piston units 24 for the upper mold segments 25 which are constructed to form the tread surface of the tire to be molded. The lower part 12 of each L-shaped mold carrier is provided on the side thereof opposite from the upright 18 with an upwardly extending arm 12′ which is tiltably mounted at 12″ on an upwardly extending portion of an additional carrier 41 mounted on the annular box-shaped carrier part 4. Each mold carrier 11 is tiltable about the aforementioned tilting axis 12″ from the substantially vertical position, shown at the right side of FIG. 1, to the substantially horizontal position, shown at the left side thereof, by a cylinder-and-piston unit 26 operatively connected at opposite ends to the column 13 and the lower mold carrier 41, respectively. The cylinder-and-piston unit 26 is controlled in such a manner that each of the mold carriers can also be fixed in any position between the two extreme positions respectively shown at the right and the left side of FIG. 1. A spray unit 40 (shown in FIG. 2) is also coordinated with the turntable 1 from which exactly dosed separating compounds may be sprayed into an open mold to facilitate separating of the mold parts from the tire molded therein.

A second turntable 2 is mounted adjacent and laterally of the turntable 1, likewise turnable about a vertical axis. The second turntable 2 is provided with eighteen depositing stations 27 for the reception of core part, respectively assembled cores 30, and with eighteen depositing stations 28 for the reception of eighteen tires in which the core 13 is still at least partly arranged. The depositing stations 27 are formed by eighteen palletts 29 arranged easily removable from the turntable 2, circumferentially equally spaced from each other along an outer circle, whereas the depositing stations 28 are arranged uniformly circumferentially displaced and respectively aligned with the outer depositing stations 27 in radial direction on an inner circle concentric with the outer circle. A plurality of working places with tools for disassembly and respective reassembly of the cores are provided about the turntable 2, as well as devices for spraying of separating compounds and devices for the connection of bead rings.

The second turntable 2 is constructed as a frame 31, which for transporting reasons is formed from a plurality of connected parts, and the frame 31 is turnably mounted on a portion 32 of the foundation by means of an annular ball bearing 33 for rotation about a vertical axis. An annular skirt 42 extends downwardly from the turntable 2 and the skirt is provided with a plurality of upwardly extending slots 43 uniformly displaced from each other into which rollers 44 provided on opposite ends of an arm 45 are respectively adapted to engage and in which the arm 45 is driven over a gearing from a motor 46 so as to stepwise turn the turntable 2 about its vertical axis. The arrangement is made in such a manner that the drive motor 46 which turns the turntable 2 about its vertical axis has the same number of revolutions as the drive motor 39 turning the turntable 1 about its vertical axis so that the turntable 2 is stepwise driven synchronously with the turntable 1 and preferably in a direction as indicated by the arrow II in FIG. 2, that is in the direction opposite to the direction of the turntable 1.

Figure 3:
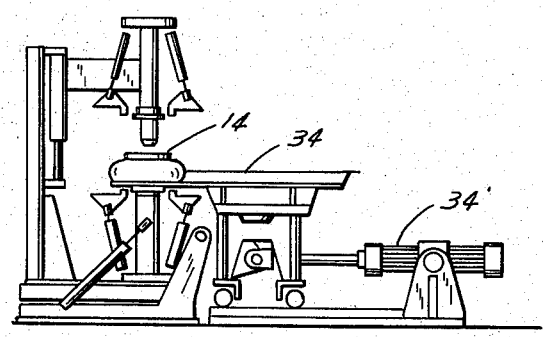
FIG. 3 is a partial side view of the apparatus.

The apparatus includes further a carriage 34 serving to transfer a tire including a core from the first turntable 1 to the second turntable 2. The carriage 34 is mounted on guide rollers and movable in direction of its longitudinal axis by a cylinder-and-piston unit 34′ to project in its extended position into the open mold 14 as shown in FIG. 3. The transfer of a tire including the core may be carried out in a simple manner by raising the carrier 22 which carries the upper mold part 21 of the mold 14, whereafter the tire including the core is disconnected from the upper mold part and deposited on the carriage 34. Subsequently thereto the carriage 34 is moved back out of the region of the mold carrier 11 and the tire including the core is deposited onto a respective depositing station 28 on the inner circle of the second turntable 2.

The apparatus includes a further device 35 for transferring the reassembled cores 30 from the depositing stations 27 arranged along the outer circle of the turntable 2 into the respective mold 14. The device 35 is constructed similar to the above-described carriage 34 so that a core 30 may be moved after lowering of the upper mold part 21 into the latter by means of hooks not shown in the drawing provided thereon.

The above-described apparatus will be operated as follows:

At the start of the operation assembled cores 30 are mounted on the outer depositing station 27 on the second turntable onto the palletts 29 and sprayed with a separating compound. Thereafter, a first pallett 29 is moved on the carriage 35 and the latter is moved into the respective open mold 14 at I of the turntable 1. After lowering the upper mold part 21 of the mold 14, the core 30 is suspended thereon and the upper mold part is again raised while the carriage 35 is moved into its starting position adjacent the turntable 2. The turntable 1 is now turned in direction of the arrow I through 20° and in this position II an annular reinforcement for the tread surface of the tire to be produced is mounted on grippers, not shown in the drawing, whereafter the upper mold part is lowered and fixed in the lowered position while the grippers move the reinforcement into the open mold. After a subsequent turning of the turntable 1 through 20°, half of the segments 17 are brought into the closed position, whereafter the grippers transfer the tread surface reinforcement onto these closed segments. After return of the grippers to their starting position, the remaining segments 17 are brought to the closed position and the L-shaped carrier 11 is tilted subsequently thereto through 90° to a substantially horizontal position, as shown at the left side of FIG. 1. The turntable is turned again through 20° and in this position IV of the turntable the molding of the portion of the tire which is located radially inwardly of the tread surface is carried out. Subsequently thereto the L-shaped mold carrier 11 is turned back in a position V of the turntable 1, turned through 20° with respect to its position IV to its essentially vertical starting position and now starts the hardening process of the tire body which continues while the turntable 1 is turned four times each through 20° to a position IX. In the further position X which is displaced through 180° with respect to the starting position I, the segments 17 are open and brought into their starting position below the remainder of the mold 14, whereafter the segments 25 which are constructed to form the tread surface of the tire are brought to their closed position. After exhausting the air from the cavity of the mold 14, the mold carrier 11 is tilted through 30° with respect to its vertical starting position. Thereafter the turntable 1 is turned through further 20° and in this position XI of the turntable the tread surface of the tire is molded. In the positions XII–XV the tread surface is let to harden, whereby in the position XII the mold carrier 11 is tilted back to its vertical starting position. In the position XVI of the turntable 1 the segments 25 forming the tread surface of the tire are opened and together with the released upper end part 21 of the mold 14 lifted, whereby the tire with the core 30 is held by a hook-shaped core holding device to the upper mold end part 21 of the mold 14. Subsequently thereto, the carriage 34 is moved into the opened mold 14, the upper end part 21 of the mold is lowered, the core 30 carrying the tire is released and deposited on the carriage 34. Subsequently thereto the carriage 34 is moved back to its starting position and the tire including the core is deposited on a corresponding depositing station 28 of the second turntable 2, that is on the depositing station 28 located at a position XVI of the turntable 2.

In the position XVII of the first turntable 1 the mold 14 is cleaned and in the position XVIII the upper mold end part 21 of the mold is lowered while the segments 17 are at least in part brought to the closed position and the mold is sprayed with a separating compound, whereafter in the next position a new production cycle for a tire is started.

The turntable 2 is driven synchronously with the turntable 1, whereby in the positions IV–VIII of the turntable 2 the individual parts of the core 30 from a corresponding depositing station 28 of the turntable 2 are taken out from the tire and are reassembled on the respective palletts 29 on the outer depositing stations 27 of the second turntable. At the position IX of the turntable 2 the reassembled core completely released from the tire is taken off. In the position XI of the turntable 2 the now completely reassembled core 30 is sprayed with separating means and provided with bead rings for a new tire so that it can be brought again into the mold 14.

From the above-described method of operation it is evident that appropriate depositing stations on the turntable 2 are coordinated with each of the mold carriers 11 on the turntable 1. By the coordination of the eighteen mold carriers 11 illustrated in the embodiment disclosed on the first turntable to the eighteen depositing stations on the outer and inner circle on the second turntable it is therefore possible if different cores and correlated mold elements are mounted on each of the eighteen mold carriers to produce during one operating cycle eighteen different types of tires. Of course, it is also possible to mount on each of the mold carriers identical molds 14 so that during one operating cycle eighteen tires of the same type are produced, or to arrange on the mold carriers 11 groups of molds of different configuration so that depending on the number of groups a corresponding number of different tires may be produced during one operating cycle.

It will be understood that each of the elements described above, or two or more together, may also find a useful application in other types of apparatus for molding tires differing from the types described above.

While the invention has been illustrated and described as embodied in an apparatus for molding tires including two adjacent turntables, one of which is provided with a plurality of molds circumferentially spaced from each other and the other of which is provided with a plurality of stations arranged along two concentric circles with the stations on each circle corresponding in numbers to that of the number of molds carried by the first turntable, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for molding tires, a combination comprising a plurality of multi-part molds each comprising an inner split core configurated in accordance with the inner surface of the tire to be molded and a plurality of outer mold parts arranged about the core and configurated in accordance with the outer surface of the tire; a plurality of mold carriers, one for each of said multi-part molds; a first turntable having a vertical axis and carrying on an upper surface thereof said plurality of mold carriers circumferentially displaced from each other; a second turntable adjacent said first turntable and having an axis parallel to that of said first turntable and being provided at its upper surface with a first plurality of depositing stations circumferentially displaced from each other and equal in number to the plurality of multi-part molds for receiving said cores and a second plurality of depositing stations circumferentially displaced from each other and equal in number to said first plurality of depositing stations for receiving finished tires with the cores retained therein; and means for turning said first and said second turntables synchronously and stepwise about their axes.

2. A combination as defined in claim 1, wherein said turning means are arranged to turn said turntables in opposite directions.

3. A combination as defined in claim 1, wherein the number of mold carriers on said first turntable is at least ten.

4. A combination as defined in claim 1, wherein the number of mold carriers on said first turntable is eighteen.

5. A combination as defined in claim 1, wherein said first and said second plurality of depositing stations are respectively provided on two concentric circles on said second turntable.

6. A combination as defined in claim 5, wherein the first depositing stations for said cores are provided on the outer one of said concentric circles and the second depositing stations for the finished tires including the cores are provided on the inner one of said concentric circles.

7. A combination as defined in claim 1, wherein the molds are carried by said mold carriers on said first turntable substantially at the same elevation as said depositing stations on said second turntable, and including first carriage means for transferring finished tires including the cores from said first turntable to said second turntable and second carriage means for transferring the cores from said second turntable to said mold carriers of said first turntable.

8. A combination as defined in claim 1, and including means for tilting each of the mold carriers from a substantially vertical starting position to a substantially horizontal end position and for arresting each mold carrier in a position between said starting and said end positions.

* * * * *